United States Patent [19]

Sakaguchi et al.

[11] Patent Number: 5,589,722
[45] Date of Patent: Dec. 31, 1996

[54] SHEET COIL MOTOR AND METHOD OF FABRICATING THE SAME

[75] Inventors: Takahiro Sakaguchi, Kodaira; Fumio Sakamoto, Machida, both of Japan

[73] Assignee: TEAC Corporation, Tokyo, Japan

[21] Appl. No.: 227,792

[22] Filed: Apr. 14, 1994

[30] Foreign Application Priority Data

Apr. 16, 1993 [JP] Japan ................................. 5-019623 U
Apr. 16, 1993 [JP] Japan ................................. 5-090195
Mar. 24, 1994 [JP] Japan ................................. 6-053774

[51] Int. Cl.⁶ ............................ H02K 3/26; H02K 21/12; H02K 19/26
[52] U.S. Cl. .................................. 310/180; 310/40 MM; 310/156; 310/268
[58] Field of Search ................................ 310/268, 179, 310/180, 68 B, 156, DIG. 3, 40 MM, 208, 218, 214, 157

[56] References Cited

FOREIGN PATENT DOCUMENTS 63-173017 7/1988 Japan.
4-140050 5/1992 Japan.

Primary Examiner—Steven L. Stephan
Assistant Examiner—Jonathan Link
Attorney, Agent, or Firm—Michael N. Meller

[57] ABSTRACT

A sheet coil motor is configured such that a plurality of coil units are attached to a circuit substrate at a predetermined interval, the interval separating the coil units are regular. Each of the plurality of coil units includes a plurality of coils and has a shape of a sector. Accordingly, the sheet coil motor can be made thin, the number of driving sheet coils can be reduced, and the production cost can be reduced. A method of fabricating the sheet coil motor includes the steps of printing, on a sheet base, a plurality of sheet coil units, in which units a plurality of sector-shaped coils are provided, such that the coil units lie in alternately opposite directions, cutting out the sheet coil units from the sheet base, attaching sheet coil units, in which units a plurality of sector-shaped coils are provided, on a substrate at an arbitrary distance from each other, and attaching driving sheet coils thus fabricated to the substrate so as to be opposite a rotor magnet at a close distance. Accordingly, the number of sheet coil units printed on and cut out from a sheet base can be increased so that the efficiency of production can be improved.

16 Claims, 18 Drawing Sheets

SHEET COIL MOTOR AND METHOD OF FABRICATING THE SAME

BACKGROUND OF THE INVENTION

The present invention relates to sheet coil motors and the method of fabricating the same, and more particularly to a sheet coil motor constructed to be thin and the method of fabricating the same at a reduced cost.

In a recording/reproducing apparatus such as a magnetic disk drive and the like, a disk cartridge accommodating a flexible magnetic disk (recording medium) is inserted into a disk insertion opening provided on a front bezel of the apparatus. As the disk cartridge is inserted into the apparatus, the flexible magnetic disk is mounted on a turntable so as to be ready for recording/reproducing operation.

Efforts are made to reduce the thickness of such an apparatus. In one approach, a sheet coil motor is employed for rotating the flexible magnetic disk mounted on the turntable.

FIG. 1 is a longitudinal cross sectional view showing the construction of a conventional sheet coil motor 1A. The sheet coil motor 1A shown in FIG.1 is a direct drive motor of an axial gap type (parallel type).

The sheet coil motor 1A is provided on a circuit substrate 2. The sheet coil motor 1A has a driving sheet coil 3 formed by a plurality of coils in an annular arrangement, a rotor magnet 4 provided opposite the driving sheet coil 3 at a close distance, and Hall elements 5 provided adjacent the driving sheet coil 3 so as to detect the variation in magnetic field. The driving sheet coil 3 is provided opposite the rotor magnet 4 at a close distance.

The rotor magnet 4 is fixed on the underside of a turntable 6 on which a flexible magnetic disk (not shown) is mounted. The turntable 6 is rotatably supported, via a ball bearing 7, by a spindle 8 erected on the circuit substrate 2.

Three Hall elements 5 are soldered to the circuit substrate 2 to constitute a driving circuit (not shown) for effecting phase switching. The circuit substrate 2 is made of an iron and is provided with the driving sheet coil 3 on the upper surface thereof.

The sheet coil motor 1A having the above described construction is configured such that an electromotive force is generated between the driving sheet coil 3 and the rotor magnet 4 by allowing a current to pass through the driving sheet coil 3, and energized phases are switched between each other as the Hall elements 5 detect the electromotive force (magnetic field), thereby maintaining the rotor magnet 4 in rotation. In other words, the driving circuit switches in and out phases produced by respective coils provided in the driving sheet coil 3, on the basis of a detection signal supplied from the Hall elements 5 so that the flexible magnetic disk is rotated at a predetermined constant speed required for recording/reproduction.

As shown in FIG.2, in the sheet coil motor 1A, coils $3_1$–$3_{12}$ of the driving sheet coil 3 are provided at a regular interval in an annular arrangement so as to cover 360° of a circle. Alternatively, as shown in FIG.3, coils $3_1$–$3_9$ may be provided at a regular interval in an annular arrangement so as to cover 270° of a circle.

The plurality of coils $3_1$–$3_{12}$ or the coils $3_1$–$3_9$ of the conventional driving sheet coil 3 are printed on the substrate as a set. For example, as shown in FIG.4, six driving sheet coils 3 each including an annular arrangement of the coils $3_1$–$3_{12}$ are printed on a sheet base 9, and each driving sheet coil 3 is cut out from the sheet base 9. Accordingly, only a relatively small number of driving sheet coils 3 can be provided in a given area on the sheet base 9. Hence, there is a problem in that the number of coils that can be printed on and cut out from a sheet base is relatively small, and in that a relatively large portion not used for the driving sheet coils 3 is wasted, thereby reducing the efficiency of the production.

In a conceivable construction to resolve the above problems, sheet Coils having a shape of a sector are concentrically arranged and soldered on the circuit substrate.

As shown in FIG.5, in a conceivable sheet coil motor 1B of the above described construction, connecting terminals 10 of the coils are disposed in the intervals between the coils. The connecting terminals 10 of the coils are connected by soldering to connecting terminals (not shown) formed in the circuit substrate 2.

In the conceivable sheet coil motor 1B, solder 10d which is put on the connecting terminal 10 projects above the driving sheet coil 3. Therefore, it is necessary to provide a large distance L between the rotor magnet 4 and the driving sheet coil 3 so that the rotor magnet 4 does not come into contact with the solder 10d.

Hence, an effort to reduce the thickness of the motor is thwarted by the solder 10d provided as a result of soldering the connecting terminal 10 of the driving sheet coil 3 to the connecting terminal (not shown) of the circuit substrate 2. Another problem is that inspection of the connection between the connecting terminal 10 and the circuit substrate 2 is performed while the turntable 6 is detached from the circuit substrate 2. Such an inspection is troublesome and prevents efficient maintenance from being performed.

FIG.6 shows another conceivable sheet coil motor 1C, where the driving sheet coil 3 can be as thin as 0.3 mm. However, the height of 0.7 mm of the Hall elements 5 is necessary in order to ensure that the Hall elements detect the magnetic field with a sufficient precision for rotation control.

A relatively large separation L is to be provided between the driving sheet coil 3 and the rotor magnet 4 in order to prevent the rotor magnet 4 and the Hall elements 5 from coming into contact with each other. As a result, not only the reduction of the thickness of the motor can not be achieved, but the driving force of the motor is small, and it is impossible to obtain a satisfactorily large driving torque.

Hence, there is a problem in that an expensive sintered magnet is needed to form the rotor magnet 4 in order to ensure that the magnetic flux density sufficient for the driving of the rotor magnet 4 at a predetermined constant speed is obtained.

SUMMARY OF THE INVENTION

Accordingly, it is a general object of the present invention to provide a novel and useful sheet coil motor in which the above problems are eliminated and the method of fabricating the same.

In order to achieve the above object, the present invention provides a sheet coil motor comprising a driving sheet coil formed by a plurality of coils, and a rotor magnet provided opposite the driving sheet coil at a close distance, wherein the driving sheet coil is configured such that a plurality of coil units having a shape of a sector are concentrically arranged at an arbitrary distance from each other.

According to this aspect of the present invention described above, the thickness of a motor can be reduced because a driving sheet coil is formed by disposing sheet coil units, in which units a plurality of coils are provided, on the substrate at an arbitrary distance from each other. Moreover, the number of sheet coil units used in a motor can be reduced so that productivity of the fabrication of the motor is increased, and the production cost is reduced as compared to the conventional method of fabricating the motor.

The present invention also provides a method of fabricating a sheet coil motor, comprising the steps of printing, on a sheet base, a plurality of sheet coil units, in which units a plurality of sector-shaped coils are provided, such that the coil units lie in alternately opposite directions, cutting out the sheet coil units from the sheet base, attaching sheet coil units, in which units a plurality of sector-shaped coils are provided, on a substrate at an arbitrary distance from each other, and attaching driving sheet coils thus fabricated to the substrate so as to be opposite a rotor magnet at a close distance.

According to this aspect of the present invention described above, by printing, on a sheet base, a plurality of coil units, in which units a plurality of sector-shaped coils are provided, such that the coil units lie in alternately opposite directions, and by cutting out sheet coil units from the sheet base, the number of sheet coil units printed on and cut out from a sheet base can be increased, resulting in a higher production efficiency. Consequently, the production cost can be reduced.

The present invention also provides a sheet coil motor comprising a driving sheet coil in which a plurality of coils connected to a connecting pattern formed on a substrate are provided in an annular arrangement, a rotor magnet provided so as to be opposite the driving sheet coil at a close distance, wherein the driving sheet coil has, at the periphery thereof, connecting terminals soldered to the connecting pattern.

According to this aspect of the present invention described above by providing, at the periphery of the driving sheet coil, connecting terminals soldered to the connecting pattern, the separation between the rotor magnet and the driving sheet coil can be made small and the motor can be made thin. Moreover, soldering condition of the connecting terminals can be inspected and maintained without removing the rotor magnet.

The present invention also provides a sheet coil motor comprising a driving sheet coil in which a plurality of coils are provided in an annular arrangement, a rotor magnet provided so as to be opposite the driving sheet coil at a close distance, and Hall elements which, provided adjacent the driving sheet coil, detect the variation in magnetic field, wherein the rotor magnet has a receding part in that part of the rotor magnet which is opposite the Hall elements.

According to this aspect of the present invention, by providing a receding part in that part of the rotor magnet which is opposite the Hall element, the separation between the driving sheet coil and the rotor magnet can be made significantly small, so that the motor can be made thin. Moreover, a relatively inexpensive plastic magnet can be used in the motor because it is possible to ensure that magnetic flux density sufficient to drive a turntable can be obtained even with a plastic magnet, which is characterized by weaker magnetic force than a sintered magnet.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

A detailed description will be given below, with reference to the attached drawings, of the sheet coil motor and the method of fabricating the same according to a first embodiment of the present invention.

Figure 1:
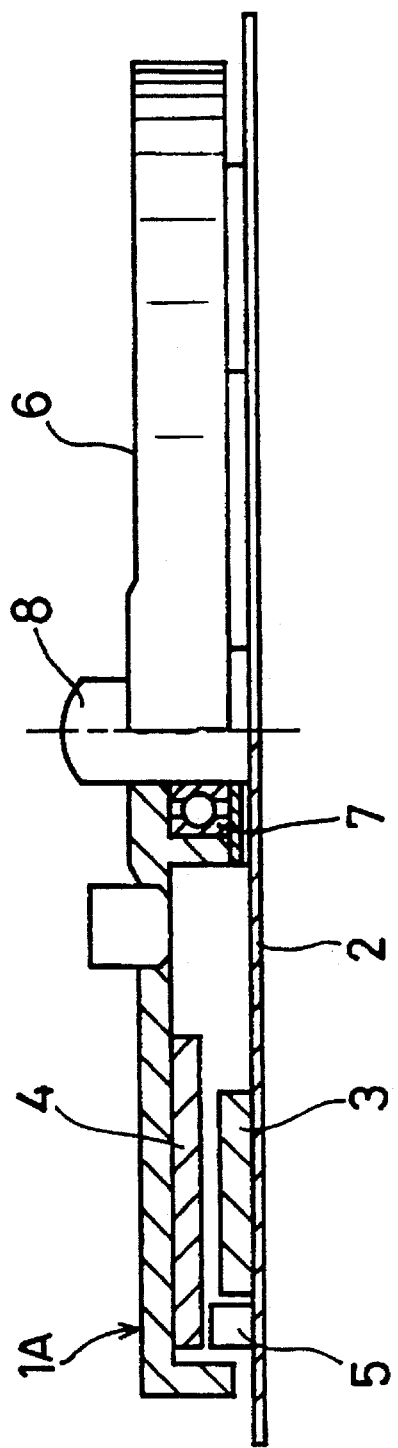
FIG. 1 is a longitudinal cross sectional view of a conventional sheet coil motor.
Figure 2:
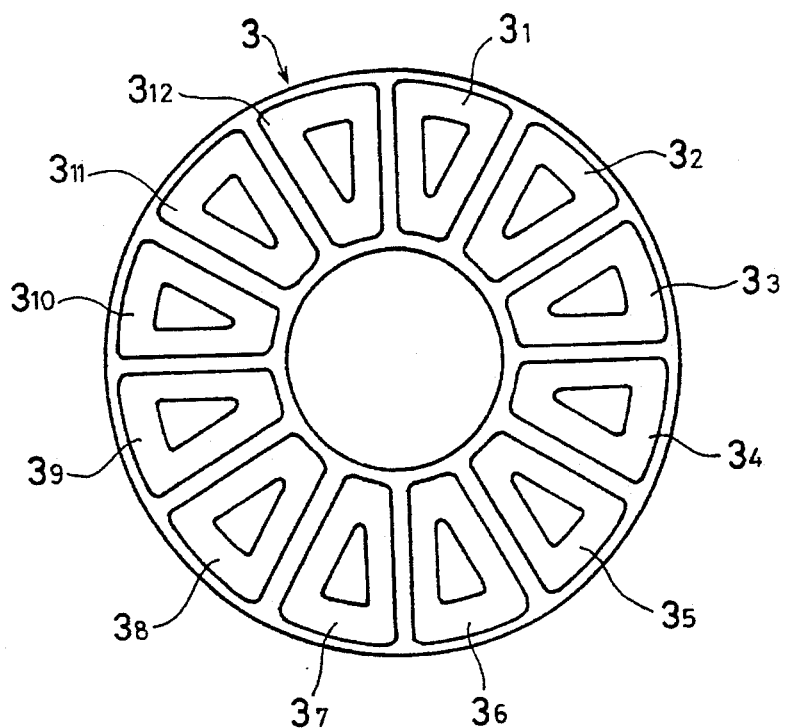
FIG. 2 is a top view of a conventional driving sheet coil.
Figure 3:
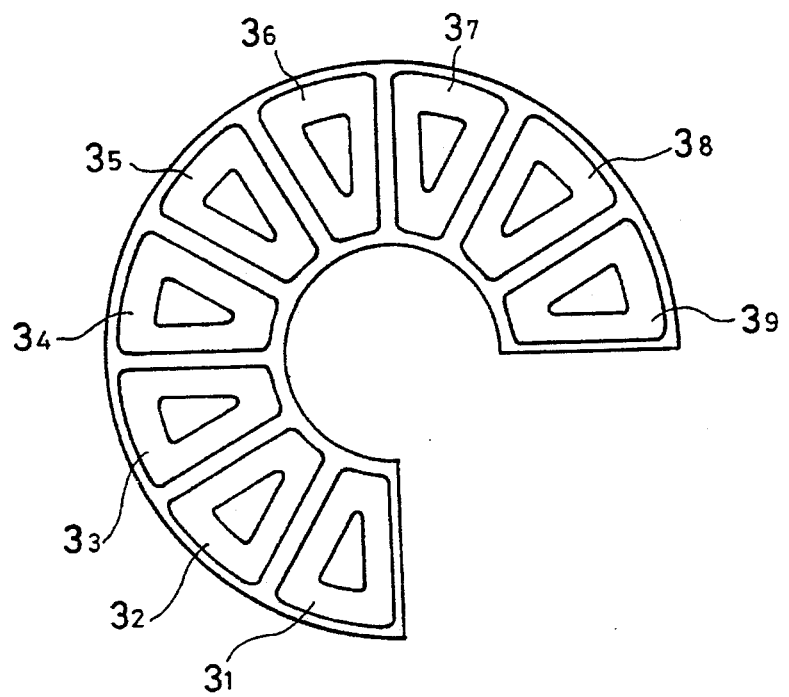
FIG. 3 is a top view of another conventional driving sheet coil.
Figure 4:
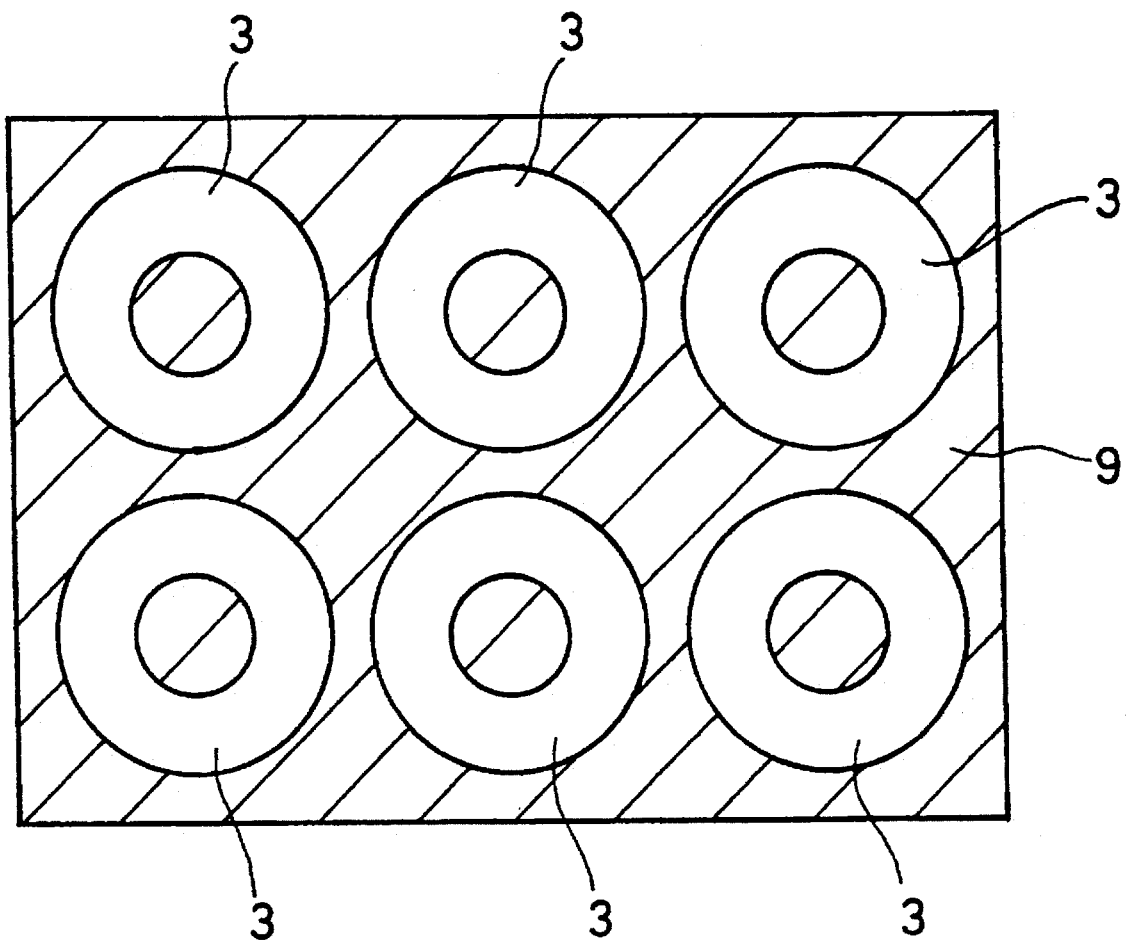
FIG. 4 is a top view for explaining the arrangement of conventional coils printed on a sheet base.
Figure 7:
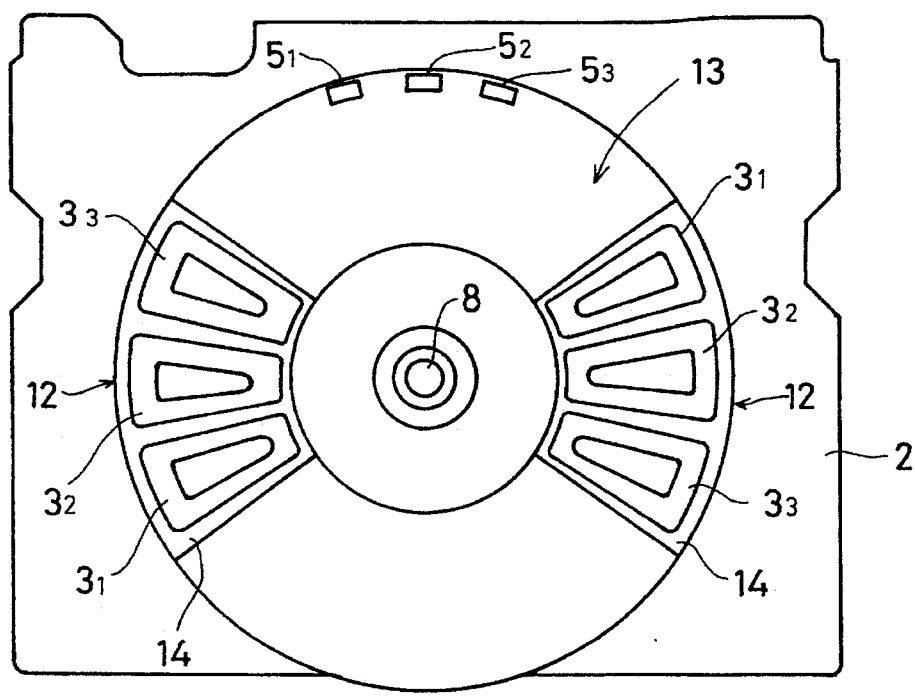
FIG. 7 is a top view of the sheet coil motor according to a first embodiment of the present invention.

FIG. 7 shows a sheet coil motor 11 according to the first embodiment of the present invention. In the figure, those parts that are identical to the parts of the sheet coil motor 1A shown in FIG. 1 are designated by the same reference numerals and the description thereof is omitted.

The sheet coil motor 11 is a direct drive motor of an axial gap type (parallel type) in which a flexible magnetic disk or the like is rotated at a constant predetermined speed required for recording/reproduction.

As shown in FIG. 7, the sheet coil motor 11 is configured such that a pair of separate coil units 12 are attached to the circuit substrate 2 at 180° displacement from each other. The interval between each of the coil units 12 is just wide enough to accommodate three coils.

Figure 8:
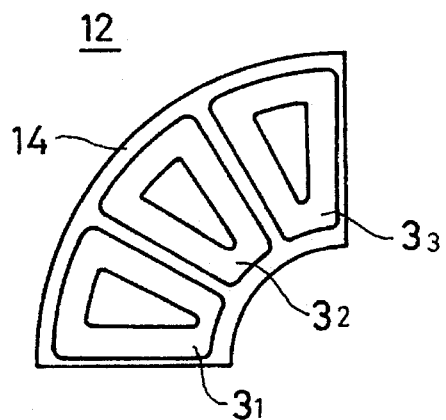
FIG. 8 is a top view of a sheet coil unit.

As shown in FIG. 8, each of the pair of coil units 12 is configured such that three coils $3_1$–$3_3$ are printed on a sheet base 14. Since the sheet coil motor 11 is configured such that a driving sheet coil 13 is constructed of the pair of coil units 12, the number of coils can be reduced, and the production cost can be reduced as compared to the conventional motor.

In the sheet coil motor 11, the coils $3_1$–$3_3$ of each of the coil units 12 are driven as part of a three-phase motor. Three Hall elements $5_1$–$5_3$ for detecting the magnetic field of each phase are soldered to the circuit substrate 2 between the pair of the coil units 12.

By including the three coils $3_1$–$3_3$, the coil units 12 has an outline of a sector.

Figure 9:
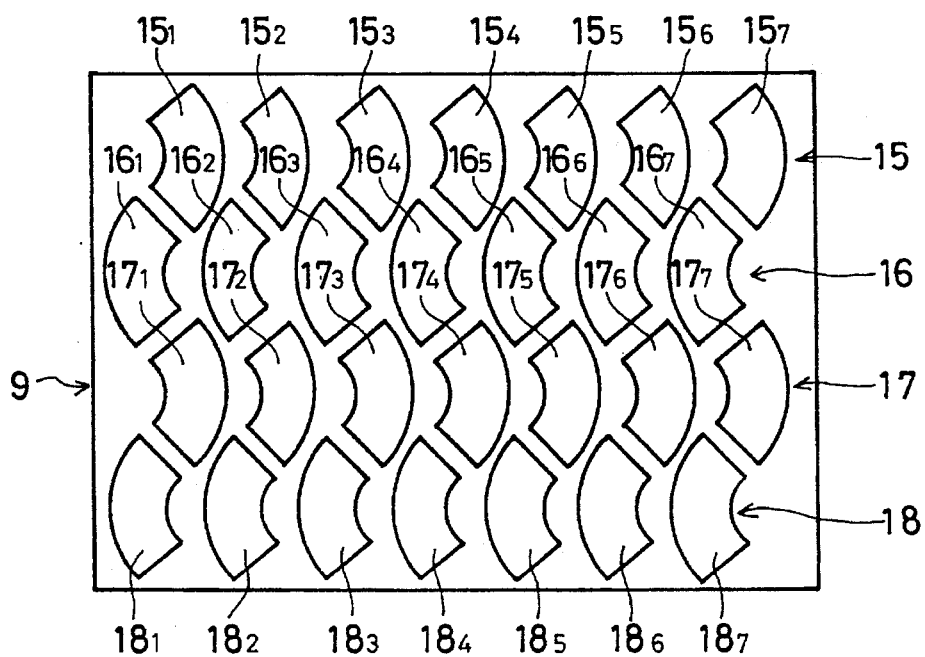
FIG. 9 is a top view for explaining the arrangement of coil units printed on a sheet base.

As shown in FIG. 9, the coil units 12 are printed on the sheet base 9 so that they lie in alternately opposite directions (that is, 180° rotated with respect to each other) in the top-to-bottom direction of FIG. 9. That is, a first row of coil units 15, a second row of coil units 16, a third row of coil units 17 and a fourth row of coil units 18 are printed on the sheet base 9, each row consisting of coil units having the same construction as the coil unit 12 described above.

The second row of coil units 16 (coil units $16_1$–$16_7$) is printed on the sheet base 9 such that it is symmetric with the first row of coil units 15 (coil units $15_1$–$15_7$).

The third row of coil units 17 (coil units $17_1$–$17_7$) is printed such that it is symmetric with respect to the second row of coil units 16 (coil units $16_1$–$16_7$) and lie in the same direction as the first row of coil units 15 (coil units $15_1$–$15_7$).

The fourth row of coil units 18 (coil units $18_1$–$18_7$) is printed such that it is symmetric with respect to the third row of coil units 17 (coil units $17_1$–$17_7$) and lie in the same direction as the second row of coil units 16 (coil units $16_1$–$16_7$).

Therefore, the sector-shaped coil units 15–18 can be arranged as closely as possible by laying them out in alternately opposite directions in the top-to-bottom direction. In the case of this embodiment, a total of 28 coil units 15–18 can be printed on one sheet base 9.

Thus, it becomes possible, in a coil printing process and cutting-out process, to produce a large number of coil units 15–18 per one cycle of operations. As result, the production cost can be reduced.

A description will now be given of the method of fabricating the sheet coil motor 11 having the above construction.

Figure 10:
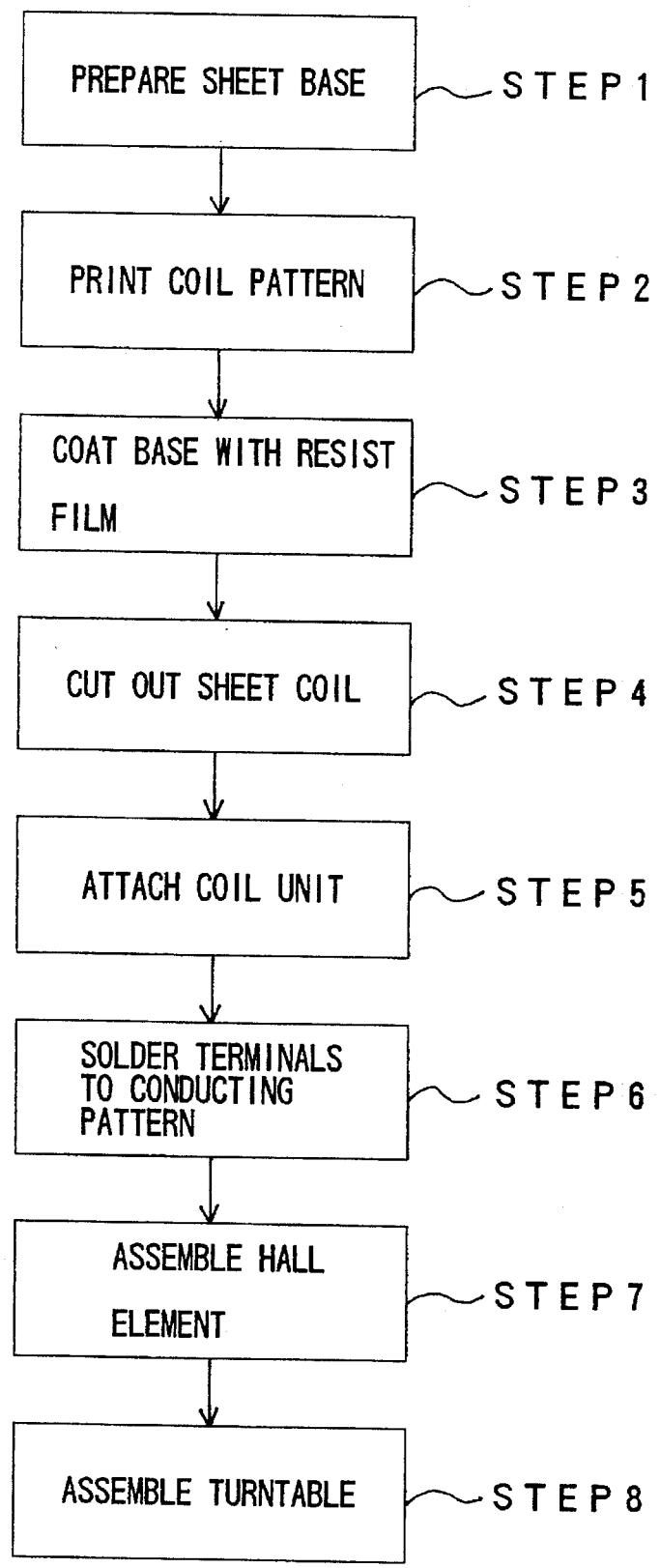
FIG. 10 is a process chart for explaining the processes for fabricating a sheet coil motor.

FIG. 10 shows the process of fabricating the sheet coil motor 11.

Referring to FIG. 10, the sheet base 9 cut to a predetermined size is prepared in the step 1.

In the next step 2, the coil pattern to produce the coils shown in FIGS. 7 and 8 is printed on the sheet base 9. In this embodiment, the coil pattern including the coil units 15–18 is printed in one operation by using a printing method such as pattern etching.

In the step 3, an insulating resist film (not shown) is allowed to coat the surface of the sheet base 9 on which the coil pattern including the coil units 15–18 is printed. Proceeding to the step 4, the outline of the coil units 15–18 is cut by means of a cutting die formed in correspondence with the arrangement of the coil units 15–18, thereby cutting out the coil units 15–18 from the sheet base 9.

In the next step 5, the pair of coil units 12 are attached to the circuit substrate 2 such that they are displaced 180° from each other at an equal distance from a spindle 8. Further, in the step 6, terminals of the coil units 12 are soldered to the conductive pattern (not shown) provided on the circuit substrate 2.

In the step 7, the Hall elements $5_1$–$5_3$ are soldered to the circuit substrate 2. In the step 8, the turntable 6 having the rotor magnet 4 attached to the underside thereof is rotatably mounted on the spindle 8 via the ball bearing 7.

In the above described production of the sheet coil motor 11, one pair of coil units 12 from among the coil units printed on and cut out from the sheet base in one operation are attached to the circuit substrate 2. Therefore, the fabrication of the driving sheet coil 13 can be performed in a short period of time, and the production cost is reduced.

Of course, the coil units 12 are not necessarily displaced 180° from each other, and it is possible to use larger or smaller number of coils.

Figure 11:
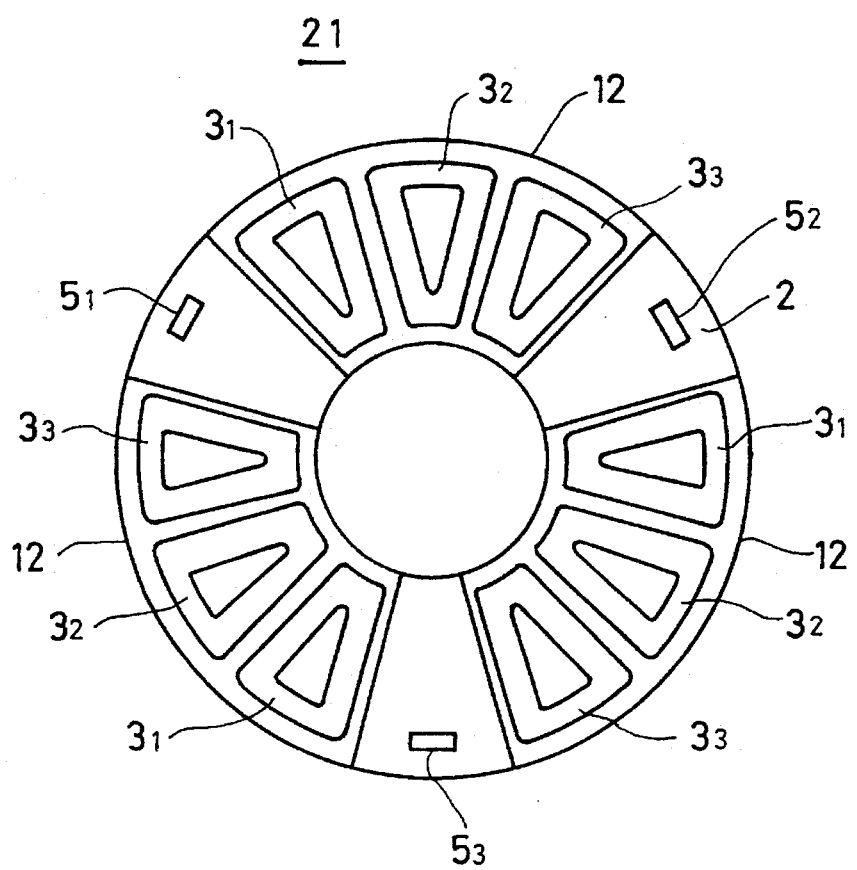
FIG. 11 is a top view of a first variation of the first embodiment of the present invention.

FIG. 11 shows a variation of the first embodiment.

Referring to FIG. 11, a driving sheet coil 21 is configured such that three coil units 12 are disposed on the circuit substrate 2 at 120° displacement from each other. In this case, the Hall elements $5_1$–$5_3$ are soldered to the circuit substrate 2 in the spaces between the coil units 12.

In the driving sheet coil 21, the intervals between the coil units 12 are just large enough to accommodate one coil, and the three coil units 12 are displaced 120° from each other. Hence, the driving torque for rotating the rotor magnet 4 becomes larger than that of the above described embodiment, and also the rotational stability is improved.

Figure 12:
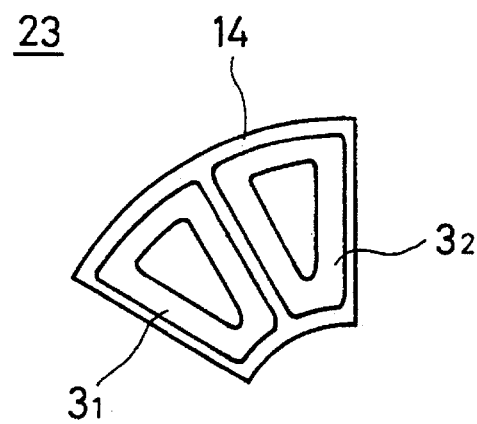
FIG. 12 is a top view showing the coil unit of a second variation of the first embodiment of the present invention.
Figure 13:
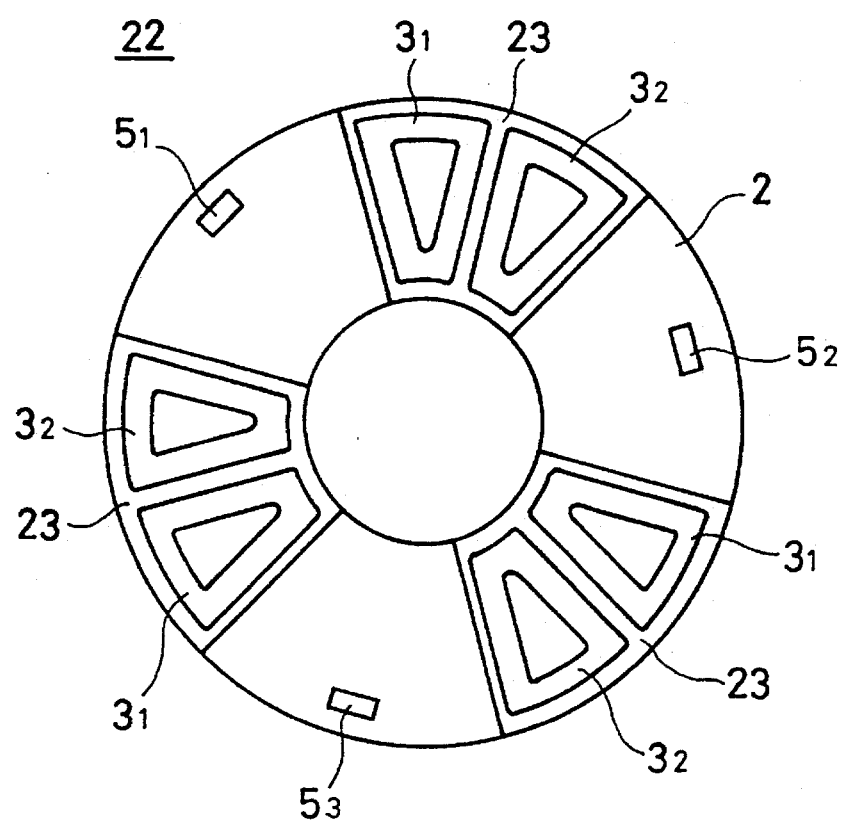
FIG. 13 is a top view of the sheet coil motor of the second variation of the first embodiment of the present invention.

FIGS. 12 and 13 show another variation of the first embodiment.

Referring to FIGS. 12 and 13, a driving sheet coil 22 is configured such that three coil units 23 are disposed at 120° displacement on the circuit substrate 2 at 120° displacement from each other. In this case, the Hall elements $5_1$–$5_3$ are soldered to the circuit substrate 2 in the spaces between the coil units 23.

As shown in FIG. 12, the coil unit 23 is configured such that two coils $3_1$ and $3_2$ are printed on the sheet base 14. Since the driving sheet coil 22 is constructed of three coil units 23, the number of coils is smaller than in the above described variation, and the production cost can be reduced.

While it is assumed that the above described embodiments are applied to motors for use in a magnetic disk drive, of course they may be applied to motors for use in an magneto-optical disk drive.

Figure 5:
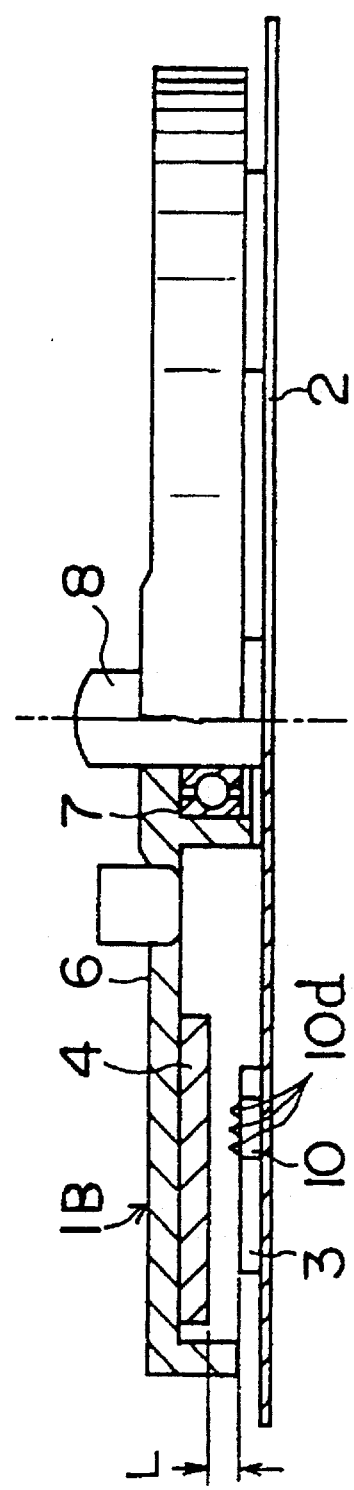
FIG. 5 is a longitudinal cross sectional view of another conventional sheet coil motor.

FIGS. 14 through 17 show a second embodiment of the present invention. In the figures, those parts that are identical to the parts of the sheet coil motor 1B shown in FIG. 5 are designated by the same reference numerals, and the description thereof is omitted.

A sheet coil motor 31 is a direct drive motor of an axial gap type (parallel type) in which a flexible magnetic disk or the like is rotated at a constant predetermined speed required for recording/reproduction.

Figure 14:
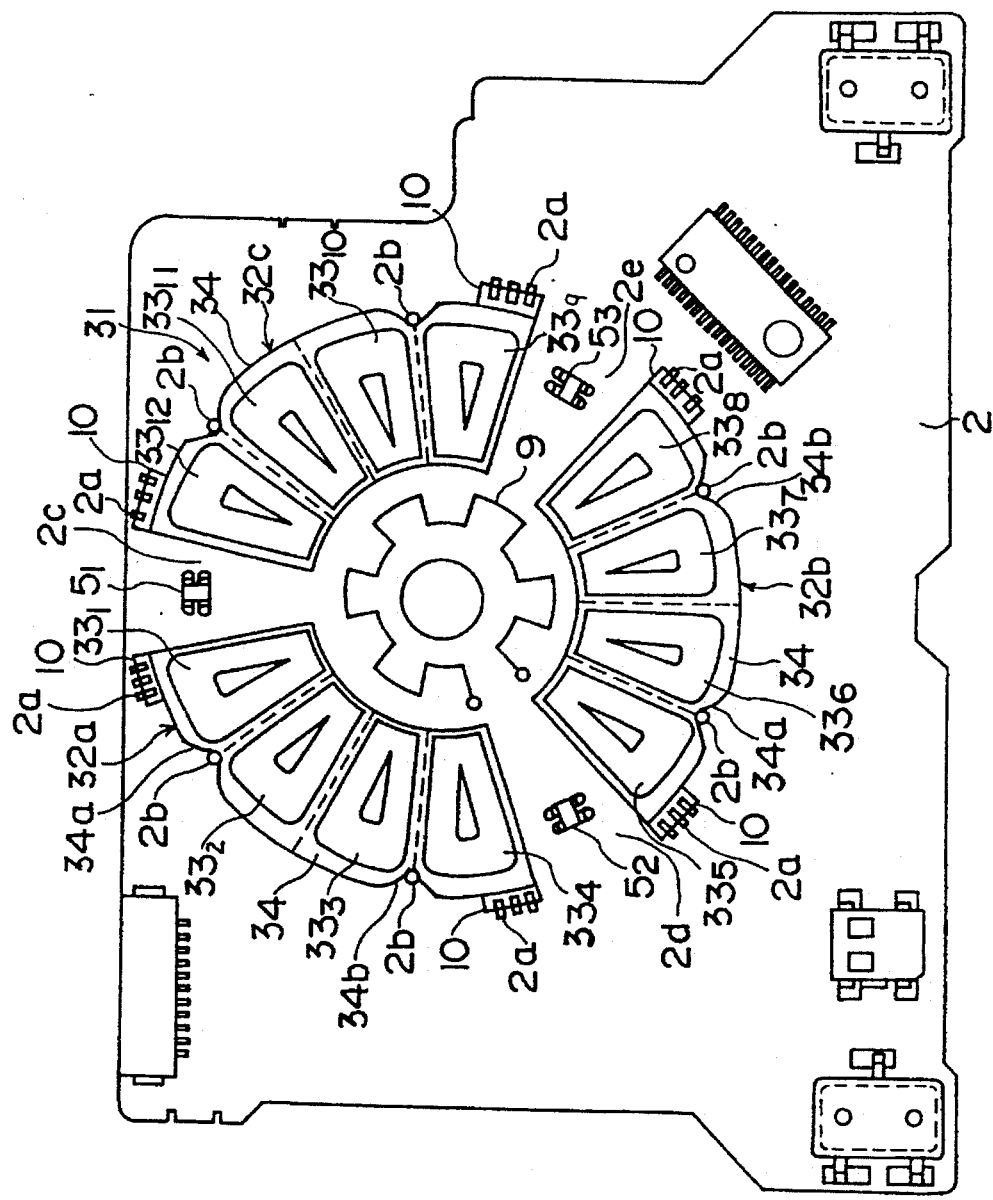
FIG. 14 is a top view of the sheet coil motor according to a second embodiment of the present invention.
Figure 15:
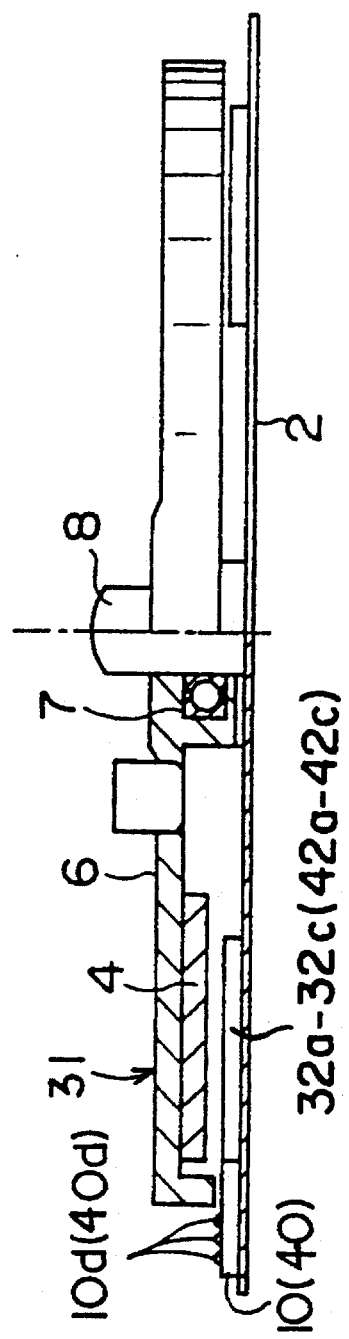
FIG. 15 is a longitudinal cross sectional view of the sheet coil motor of the second embodiment.

As shown in FIG. 14, the sheet coil motor 31 is configured such that three separate coil units 32a–32c are displaced 120° from each other on the circuit substrate 2. The intervals between the coil units 32a–32c are just large enough to accommodate one coil. The coil units 32a–32c are of the same construction, making it easy to mass-produce them.

Figure 16:
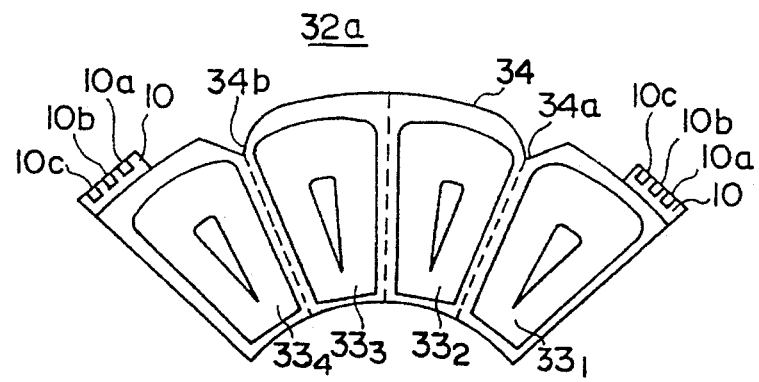
FIG. 16 is a top view of the sheet coil unit of the second embodiment.

As shown in FIG. 16, the coil unit 32a is configured such that four coils $33_1$–$33_4$ are printed on a sheet base 34, and the connecting terminals 10 integral with the coil unit 32a are formed at the periphery of the coil unit 32a.

That is, when the coils $33_1$–$33_4$ of the coil unit 32a are printed, the connecting terminals 10 are printed at the same time. Since the other coil units 32b and 32c are of the same construction as the coil unit 32a, the description thereof is omitted.

The connecting terminals 10 provided at both ends of the periphery of the coil units 32a–32c are provided with respective connecting patterns 10a–10c each associated with a phase. Since the connecting patterns 10a–10c radially project so as to be outside the periphery of the turntable 6, the solder 10d attached to the connecting patterns 10a–10c of the connecting terminals 10 is at an outside position separated from the rotor magnet 4.

Hence, it becomes possible to dispose the rotor magnet 4 as close to the coil units 32a–32c as possible.

As a result, the driving torque of the sheet motor 31 increases, and the motor can be made thin. Inspection of the soldering condition which takes place between the connecting terminals 10 and the circuit substrate 2 is easy, and the maintenance can be performed at a shorter period of time because there is no need to remove the turntable 6 and the rotor magnet 4.

The periphery of the sector-shaped sheet base 34 is provided with receding parts 34a and 34b for the positioning of the coil units 32a–32c.

The receding parts 34a and 34b are disposed at an interval of two coils. The positioning of the coil units 32a–32c at predetermined positions is effected by engaging the receding parts 34a and 34b with bosses 2b projecting upright from the circuit substrate 2. Accordingly, the separate coil units 32a–32c can be concentrically disposed at 120° displacement from each other simply by engaging the receding parts 34a and 34b with the bosses 2b.

In the sheet coil motor 31, the coils $33_1$–$33_{12}$ of the coil units 32a–32c are driven as part of a three-phase motor, and the three Hall elements $5_1$–$5_3$ for detecting the magnetic field associated with each phase are soldered to the circuit substrate 2 in the spaces 2c–2e intervening the coil units 32a–32c.

The outline of all the coil units 32a–32c, each of which has four coils $33_1$–$33_4$, $33_5$–$33_8$ and $33_9$–$33_{12}$, respectively, has a shape of a sector.

Figure 17:
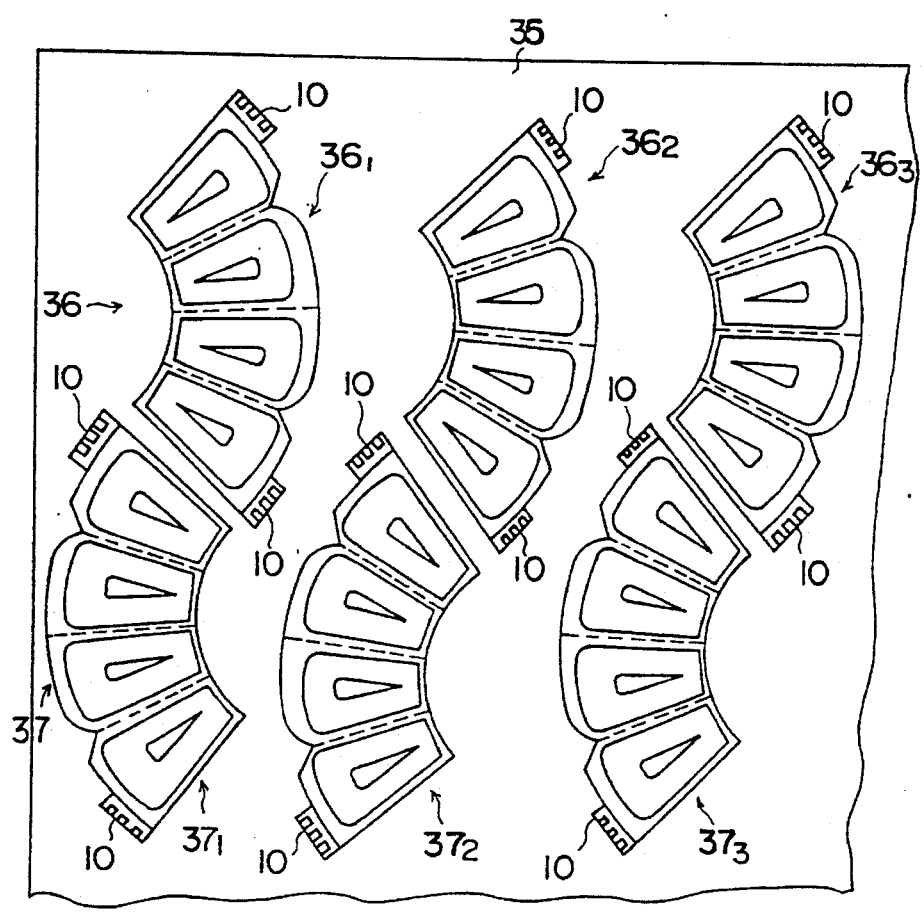
FIG. 17 is a top view for explaining the arrangement of the coil units of the second embodiment printed on the sheet base.

Thus, as shown in FIG. 17, the coil units 32 are printed on one sheet base 35 such that they lie in alternately opposite directions (that is, 180° rotated with respect to each other).

That is, a plurality of rows of the coil units 32 are printed on the sheet base 35 such that the first row of coil units 36 (coil units $36_1$–$36_n$) is printed on the sheet base 35 so as to be symmetrical with the second row of coil units 37 (coil units $37_1$–$37_n$).

A third row of coil units (not shown) is printed so as to be symmetrical with the second row of coil units 37 (coil units $37_1$–$37_n$) and lie in the same direction as the first row of coil units 36 (coil units $36_1$–$36_n$). Alternate rows of coils designated by an even numeral and those designated by an odd numeral are printed.

Therefore, the coil units 32 can be as arranged closely as possible by aligning the row designated by an even numeral and the row designated by an odd numeral in alternating directions. Thus, it becomes possible, in a coil printing and cutting-out process, to produce a large number of coil units 32 per one cycle of operations. As a result, the production cost can be reduced.

Figure 18:
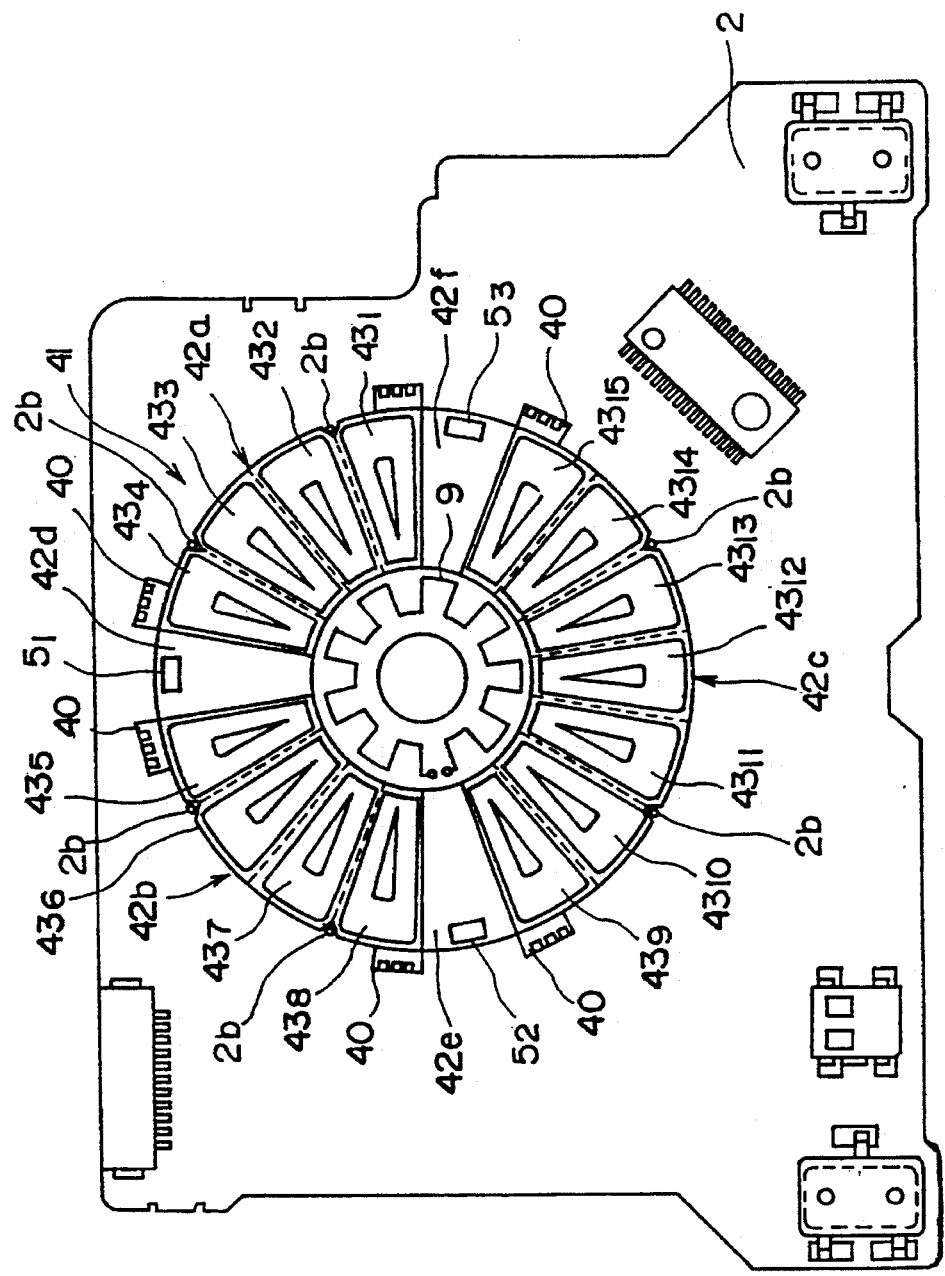
FIG. 18 is a top view of a third embodiment of the present invention.
Figure 19:
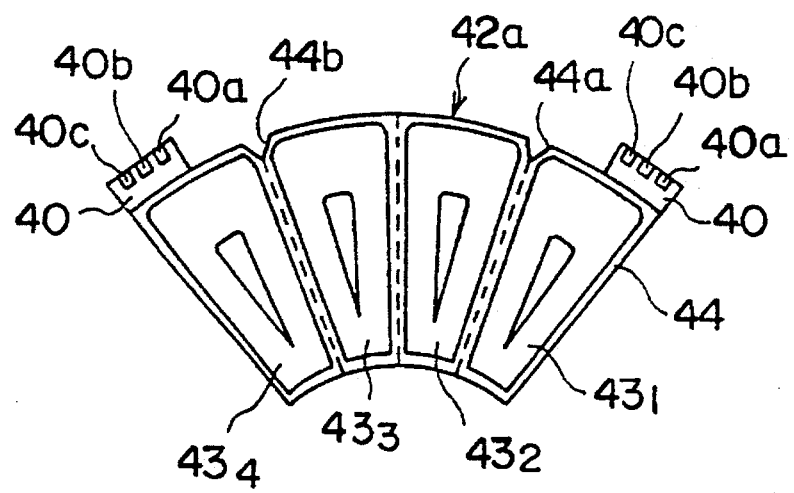
FIG. 19 is a top view of first and second coil units of the third embodiment.
Figure 20:
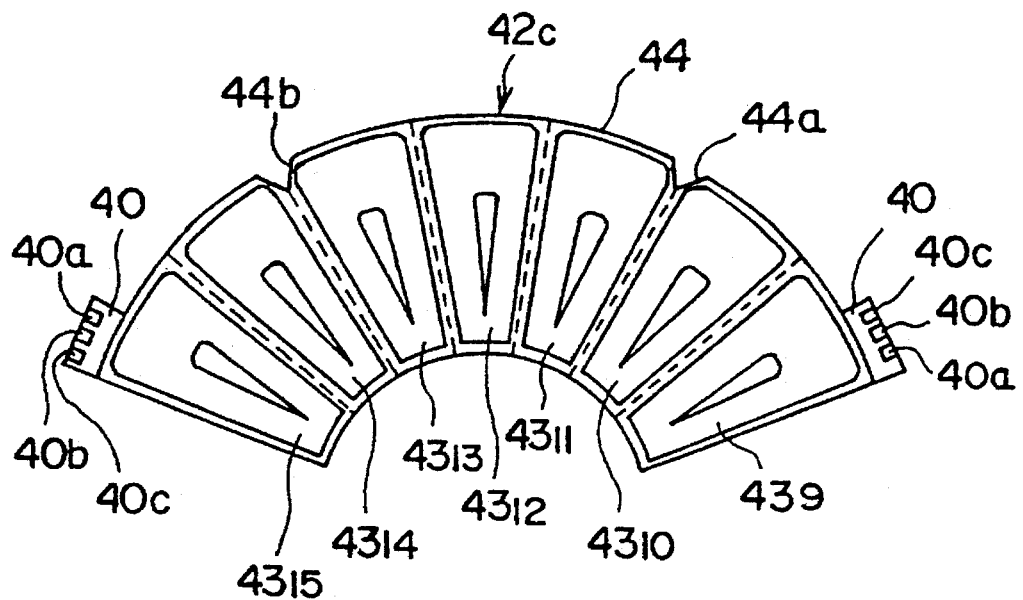
FIG. 20 is a top view of a third coil unit of the third embodiment.

FIGS. 18 through 20 show a third embodiment of the present invention.

Referring to FIG. 18, a sheet coil motor 41 has three separate coil units 42a–42c attached to the circuit substrate 2. The intervals between the coil units 42a–42c are just large enough to accommodate one coil.

The first and second coil units 42a and 42b have the same configuration; that is, the coil unit 42a has four coils $43_1$–$43_4$, and the coil unit 42b has four coils $43_5$–$43_8$. A third coil unit 42c has seven coils $43_9$–$43_{15}$.

As shown in FIG. 19, the first coil unit 42a is configured such that the four coils $43_1$–$43_4$ are printed on a sheet base 44. Connecting terminals 40 integral with the coil unit 42a are formed at the periphery of the sheet base 44 of the coil unit 42a.

That is, when the coils $43_1$–$43_4$ of the coil unit 42a are printed, the connecting terminals 40 are also printed. Since the second coil unit 42b has the same construction as the first coil unit 42a, the description thereof is omitted.

As shown in FIG. 20, the third coil unit 42c is configured such that the seven coils $43_9$–$43_{15}$ are printed on the sheet base 44. The connecting terminals 40 integral with the coil unit 42c are formed at the periphery of the sheet base 44 of the third coil unit 42c.

That is, when the coils $43_9$–$43_{15}$ of the coil unit 42c are printed, the connecting terminals 40 are also printed.

Thus, the connecting terminals 40 provided at both ends of the periphery of the coil units 42a–42c are provided with respective connecting patterns 40a–40c associated with each phase. Since the connecting patterns 40a–40c radially project so as to be outside the periphery of the turntable 6, the solder 40d attached to the connecting patterns 40a–40c of the connecting terminals 40 is at an outside position separated from the rotor magnet 4. Hence, it becomes possible to dispose the rotor magnet 4 as close to the coil units 42a–42c as possible.

As a result, the driving torque of the sheet motor 41 increases, and the motor can be made thin. Inspection of the soldering condition which takes place between the connecting terminals 40 and the circuit substrate 2 is easy, and the maintenance can be performed at a shorter period of time because there is no need to remove the turntable 6.

The periphery of the sector-shaped sheet base 44 is provided with receding parts 44a and 44b for the positioning of the coil units 42a–42c. The positioning of the coil units 42a–42c at predetermined positions is effected by engaging the receding parts 44a and 44b with the bosses 2b projecting upright from the circuit substrate 2. Accordingly, the separate coil units 42a–42c can be concentrically disposed at predetermined positions shown in FIG. 18 simply by engaging the receding parts 44a and 44b with the bosses 2b.

In the sheet coil motor 41, the coils $43_1$–$43_{15}$ of the coil units 42a–42c are driven as part of a three-phase motor, and the three Hall elements $5_1$–$5_3$ for detecting the magnetic field associated with each phase are soldered to the circuit substrate 2 in spaces $42d$–$42f$ intervening the coil units $42a$–$42c$.

Since the fifteen coils $43_1$–$43_{15}$ are provided in an annular arrangement in the sheet coil motor 41, the variation in torque is decreased, and the rotation of the turntable 6 becomes more stable as compared with the second embodiment described earlier. Hence, the disk mounted on the turntable 6 is rotated at a constant speed with good precision, and the magnetic recording/reproducing operation becomes stable.

Figure 21:
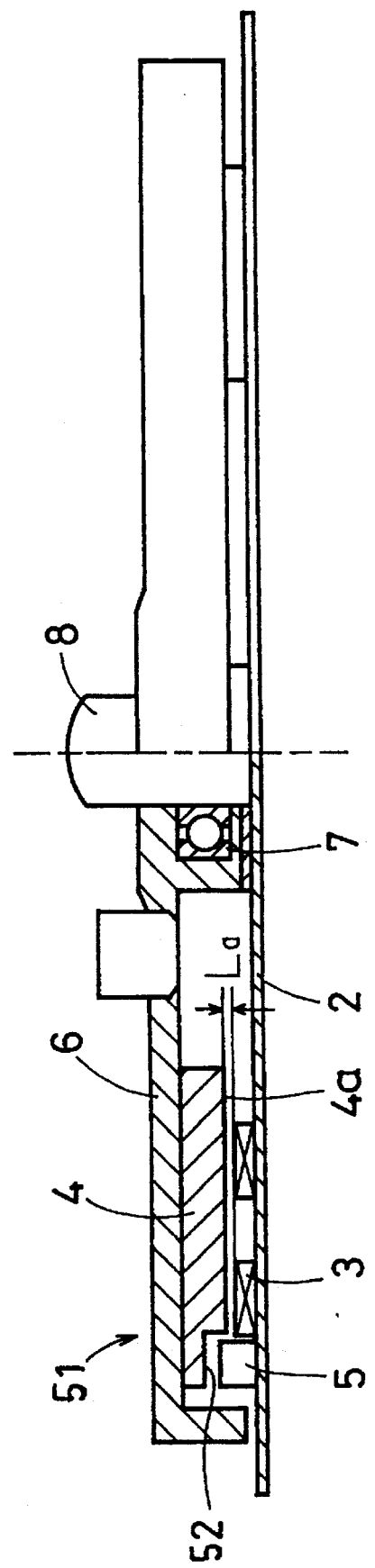
FIG. 21 is a longitudinal cross sectional view of the sheet coil motor according to a fourth embodiment of the present invention.
Figure 22:
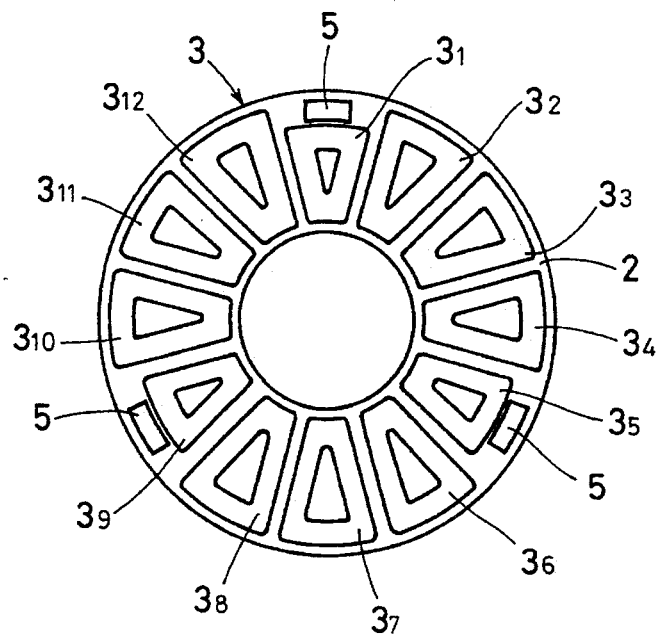
FIG. 22 is a top view of the driving sheet coil according to the fourth embodiment.

FIGS. 21 and 22 shows the sheet coil motor according to a fourth embodiment of the present invention.

Figure 6:
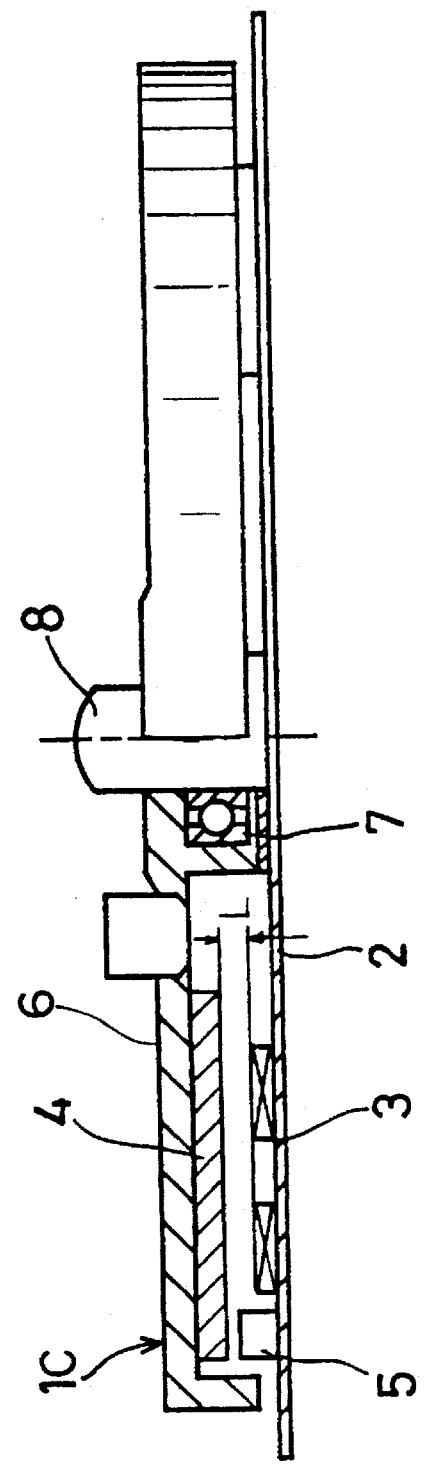
FIG. 6 is a longitudinal cross sectional view for explaining the construction of still another conventional sheet coil motor.

In the figures, those parts that are identical to the parts of the sheet coil motor 1C shown in FIG. 6 are designated by the same reference numerals, and the description thereof is omitted.

A sheet coil motor 51 is a direct drive motor of an axial gap type (parallel type) in which a flexible magnetic disk or the like is rotated at a predetermined constant speed required for recording/reproduction.

As shown in FIG. 21, the rotor magnet 4 of the sheet coil motor 51 is provided with a receding part 52 opposite the Hall element 5.

Figure 23A:
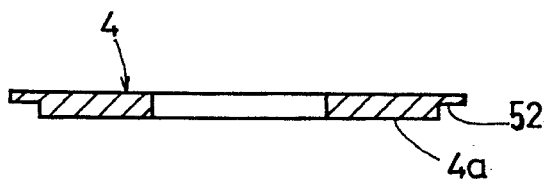
FIG. 23A is a longitudinal cross sectional view for explaining the shape of the rotor magnet according to the fourth embodiment.
Figure 23B:
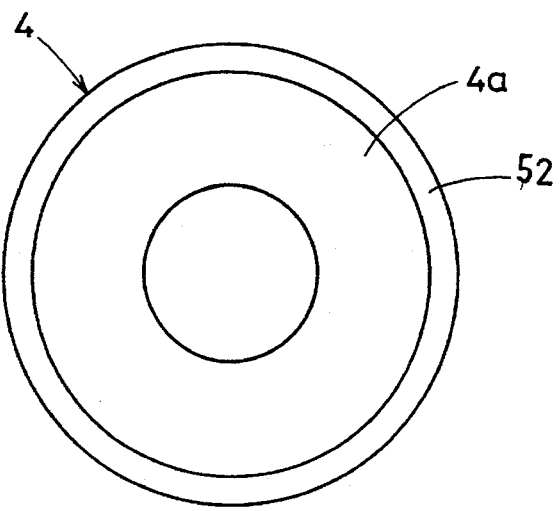
FIG. 23B is a bottom view for explaining the shape of the rotor magnet according to the fourth embodiment.

As shown in FIG. 22, the Hall elements are disposed at the periphery of the driving sheet coil 3. Therefore, the receding part 52 is provided along the periphery of the underside 4a of the rotor magnet 4, as shown in FIGS. 23A and 23B.

The driving sheet coil 3 is configured such that twelve coils $3_1$–$3_{12}$ having sector-shaped windings are printed in an annular arrangement. The coils $3_1$–$3_{12}$ are small and thin (the thickness is about 0.3 mm).

It is necessary to increase the number of poles of the driving sheet coil 3 so as to obtain a driving torque sufficient to rotate a magnetic disk at a constant speed.

In this embodiment, since the twelve coils $3_1$–$3_{12}$ are provided concentrically, it is possible to ensure that there are spaces for attaching the Hall elements 5 at the periphery of the coils $3_1$–$3_{12}$.

Since the sheet coil motor 51 is driven as a three-phase motor, three Hall elements 5 are provided on the circuit substrate 2 at 120° displacement from each other.

Therefore, in this embodiment, the circumferential dimension of the three 120°-displaced coils $3_1$, $3_5$ and $3_9$, from among the twelve coils $3_1$–$3_{12}$, is made smaller than that of the other coils. The three Hall elements 5 are soldered to the circuit substrate 2 at the periphery of the coils $3_1$, $3_5$ and $3_9$.

In order to ensure that the Hall elements 5 accurately detect the magnetic field during a rotation, the height of the Hall elements 5 is to be greater than the thickness (about 0.3 mm) of the driving sheet coil 3, a minimum height of 0.7 mm being required.

On the other hand, the receding part 52 has a radial width which is larger than the width of the upper surface of the Hall elements 5. Moreover, the receding parts 52 recedes from the underside $4a$ by a distance which is larger (more than 0.4 mm) than the difference between the height of the Hall elements 5 and the thickness of the driving sheet coil 3.

Therefore, by forming the receding part 52 at that part (periphery) of the rotor magnet 4 which is opposite the Hall element 5, it is ensured that the Hall elements 5 accurately detect the magnetic field, and that the rotor magnet 4 and the driving sheet coil 3 are made closer to each other to such a degree that the separation La between these two members is 0.2 mm.

Accordingly, it becomes possible to decrease the separation between the rotor magnet 4 and the driving sheet coil 3 than the conventional technology (La<L).

As a result, the sheet coil motor 51 can be made small and thin, and satisfactorily large magnetic density can be obtained so that the driving torque can be increased. Accordingly, it becomes possible to use a plastic magnet, which is characterized by a small magnitude of magnetic force, to form the rotor magnet 4.

Therefore, the rotor magnet 4 can be formed by using a die so that the receding part 52 is formed to be integral with the rotor magnet 4 at the periphery thereof opposite the Hall elements 5.

Consequently, there is no need to work the rotor magnet 4 to form the receding part 52, and it is possible to form the rotor magnet at a reduced cost by using an inexpensive plastic magnet. Also, the motor can be made light by forming the rotor magnet 4 of a plastic magnet.

Figure 24:
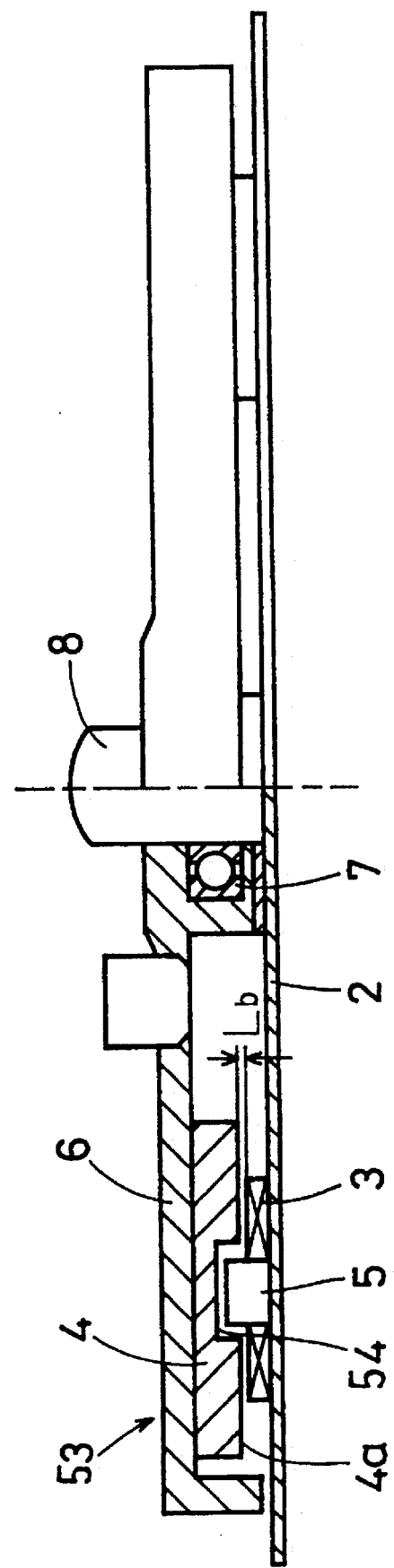
FIG. 24 is a longitudinal cross sectional view of a fifth embodiment of the present invention.

FIG. 24 shows a fifth embodiment of the present invention.

In the figure, a sheet coil motor 53 is configured such that the Hall elements 5 are provided at the center of, for example, the coils $3_1$, $3_5$ and $3_9$ of the driving sheet coil 3. In this case, the coils $3_1$, $3_5$ and $3_9$ are made to have a larger circumference than the other coils so as to ensure that there are spaces to solder the Hall elements 5 to the circuit substrate 2.

A receding part 54 is provided at the central part, in the radial direction, of the underside $4a$ of the rotor magnet 4, which central part is opposite the Hall elements 5, in order to allow for a projection of the Hall elements 5. The receding part 54 has a radial width which is larger than the width of the upper surface of the Hall elements 5. The receding part 54 recedes from the underside $4a$ by a distance which is larger (more than 0.4 mm) than the difference between the height of the Hall elements 5 and the thickness of the driving sheet coil 3.

Therefore, by forming the receding part 54 at that part (the central part in the radial direction) of the rotor magnet 4 which is opposite the Hall element 5, it is ensured that the Hall elements 5 accurately detect the magnetic field, and that the rotor magnet 4 and the driving sheet coil 3 are made closer to each other to such a degree that the separation Lb between these two members is 0.2 mm.

Figure 25:
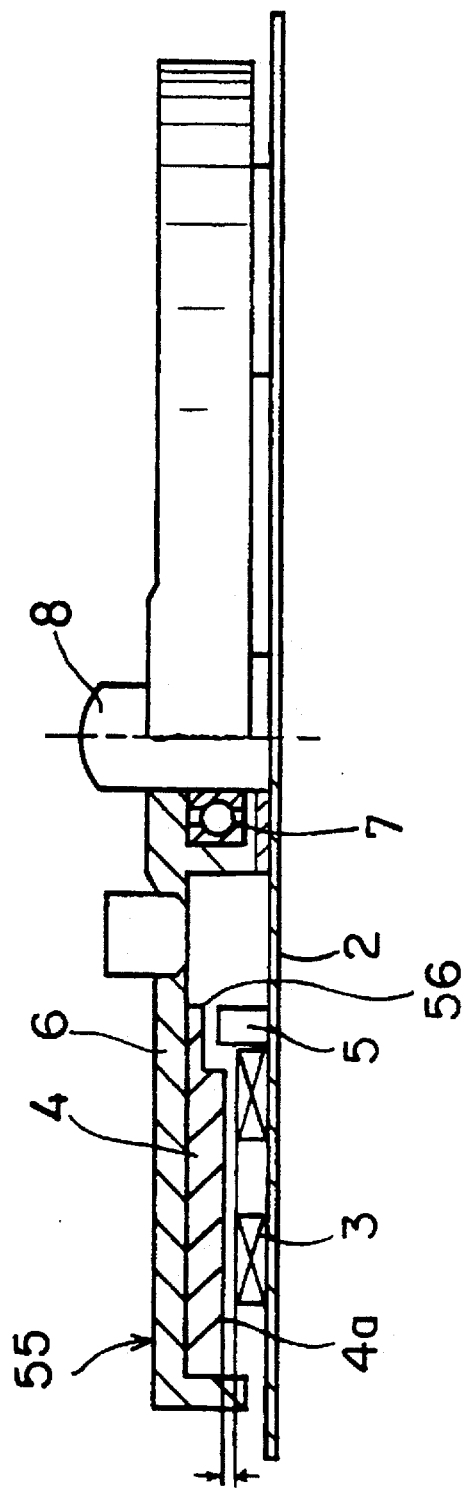
FIG. 25 is a longitudinal cross sectional view of a sixth embodiment of the present invention.

FIG. 25 shows a sixth embodiment of the present invention.

In the figure, a sheet coil motor 55 is configured such that the Hall elements 5 are provided nearer the interior of the motor than, for example, the coils $3_1$, $3_5$ and $3_9$ of the driving sheet coil 3. In this case, the coils $3_1$, $3_5$ and $3_9$ are disposed at a greater distance from the center than the other coils so as to ensure that there are sufficient spaces to solder the Hall elements 5 to the circuit substrate 2.

A receding part 56 is provided at the inner peripheral part of the underside $4a$ of the rotor magnet 4, which inner peripheral part is opposite the Hall elements 5, so as to allow for a projection of the Hall elements 5. The receding part 56 has a radial width which is larger than the width of the upper surface of the Hall elements 5. The receding part 56 recede from the underside $4a$ by a distance which is larger (more than 0.4 mm) than the difference between the height of the Hall elements 5 and the thickness of the driving sheet coil 3.

Therefore, by forming the receding part 56 at that part (inner periphery) of the rotor magnet 4 which is opposite the Hall element 5, it is ensured that the Hall elements 5 accurately detect the magnetic field, and that the rotor magnet 4 and the driving sheet coil 3 are made closer to each other to such a degree that the separation Lc between these two members is 0.2 mm.

By applying the fourth through sixth embodiments to the first and second embodiments of the present invention, it is possible to construct a thinner and more inexpensive motor.

The present invention is not limited to the above described embodiments, and variations and modifications may be made without departing from the scope of the present invention.

What is claimed is:

1. A sheet coil motor comprising:

a driving sheet coil formed by a plurality of coil units with each coil unit composed of a plurality of independent coils formed on a substrate and arranged relative to one another such that the plurality of coils in each coil unit has the shape of a sector; and a rotor magnet provided opposite the driving sheet coil at a close distance, wherein said driving sheet coil is configured such that said plurality of coil units are concentrically arranged and disposed a predetermined distance from each other.

2. The sheet coil motor as claimed in claim 1, wherein said driving sheet coil is configured such that a pair of coil units are concentrically arranged at 180° displacement from each other and a predetermined distance exists between the pair of coil units.

3. The sheet coil motor as claimed in claim 1, wherein said driving sheet coil is configured such that three coil units are concentrically arranged at 120° displacement from each other and a predetermined distance exists between the adjacent coil patterns.

4. The sheet coil motor as claimed in claim 2 wherein each of said pair of coil units is configured such that at least two coils are arranged in a sector shape.

5. The sheet coil motor as claimed in claim 1, wherein Hall elements for detecting a variation in the magnetic field when said rotor magnet is driven to rotate are disposed between at least a pair of coil units of said plurality of coil units.

6. The sheet coil motor as claimed in claim 1, wherein said driving sheet coil motor has engaging parts for the positioning of the outer periphery.

7. The sheet coil motor as claimed in claim 6, wherein said engaging parts provided for the positioning purpose are formed between the coils of said driving sheet coil.

8. The sheet coil motor as claimed in claim 5, wherein the rotor magnet has a receding part in that part of the rotor magnet which is opposite the Hall elements.

9. The sheet coil motor as claimed in claim 8, wherein said rotor magnet is provided with a receding part at the outer periphery thereof.

10. The sheet coil motor as claimed in claim 8, wherein said rotor magnet is provided with an annular receding part between the inner periphery and the outer periphery.

11. The sheet coil motor as claimed in claim 8, wherein said rotor magnet is provided with a receding part at the inner periphery thereof.

12. The sheet coil motor as claimed in claim 8, wherein each of said coil units is configured such that at least two coils are arranged in a sector shape.

13. A sheet coil motor comprising:

a driving sheet coil unit each including a plurality of coil patterns formed on a substrate, each coil pattern in each coil unit having the shape of a sector;

a rotor magnet provided so as to be opposite the coil pattern of said driving coil at a close distance;

and connecting terminals provided at the periphery of said driving sheet coil unit and soldered to said connecting patterns formed on a circuit substrate.

14. The sheet coil motor as claimed in claim 13, wherein said connecting terminals are formed at the periphery of said driving sheet coil unit so as to be integral therewith.

15. The sheet coil motor as claimed in claim 13, wherein said driving sheet coil motor has engaging parts for the positioning of the outer periphery.

16. The sheet coil motor as claimed in claim 13, wherein said connecting terminals are printed on said substrate having a shape of a sector in a printing process by which said plurality of coil patterns are also printed.

* * * * *